(12) United States Patent
Hawkins

(10) Patent No.: US 6,523,525 B1
(45) Date of Patent: Feb. 25, 2003

(54) ENGINE CONTROL SYSTEM AND METHOD OF CONTROLLING AN INTERNAL COMBUSTION ENGINE HAVING A MANDATORY ENGINE WARM-UP PERIOD

(75) Inventor: Jeffery Hawkins, Farmington Hill, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/167,036

(22) Filed: Jun. 11, 2002

(51) Int. Cl.[7] .............................................. F02M 51/00
(52) U.S. Cl. ........................ 123/491; 123/396; 701/113
(58) Field of Search ................................ 123/491, 396, 123/434, 478, 395, 319; 701/113

(56) References Cited

U.S. PATENT DOCUMENTS 4,987,871 A * 1/1991 Nishikawa ............. 123/179.18
5,601,063 A * 2/1997 Ohashi et al. ............. 123/396
6,243,642 B1 * 6/2001 Thomas ....................... 701/113

* cited by examiner

*Primary Examiner*—Bibhu Mohanty
(74) *Attorney, Agent, or Firm*—Bliss McGlynn, P.C.

(57) ABSTRACT

An engine control system and method of controlling an internal combustion engine having a mandatory engine warm-up period are provided. The engine control system includes an electronic control module (ECM) having a torque inhibit circuit and a speed inhibit circuit, and an at least one engine fluid temperature sensor in electrical communication with the torque inhibit circuit and the speed inhibit circuit of the ECM. The sensor is exposed to at least one engine fluid and is adapted to provide an inhibit signal to the torque inhibit circuit and to the speed inhibit circuit indicative of the temperature of the fluid within the engine. The torque inhibit circuit and the speed inhibit circuit are operable to cause the ECM to disregard any requests from an operator commanding an increase in engine torque or engine speed until such time as the inhibit signal from the temperature sensor exceeds a predetermined threshold.

5 Claims, 4 Drawing Sheets

ENGINE CONTROL SYSTEM AND METHOD OF CONTROLLING AN INTERNAL COMBUSTION ENGINE HAVING A MANDATORY ENGINE WARM-UP PERIOD

BACKGROUND OF THE INVENTION

1. Field of the Invention

The invention relates, generally, to the control of an internal combustion engine and, more specifically, to the initial control of an engine that mandatorily requires the engine to warm-up and reach a predetermined operating temperature before allowing the engine to be accelerated.

2. Description of the Related Art

Systems and methods for the control of internal combustion engines are well known in the art and are employed in numerous ways to regulate and control various aspects of the operation of the engine and the vehicle or device with which it is employed. The conventional practice of engine control utilizes electronic control units that consist of some type of processing device that operates upon a stored program to oversee the engine operating parameters. The electronic control units communicate with a variety of sensing devices and operate numerous actuators and active devices. The control is directly responsive to operator inputs relating to selective throttle commands, with the electronic control unit attempting to provide the optimum engine output while considering the wide variety of environmental, ambient, and dynamic conditions received through the sensing devices. In automotive applications, this control of the engine is based on operator throttle requests that result in movement of the vehicle. The electronic control unit will cause the engine to produce the requested torque while using the stored programming to optimize the efficiency of the torque output to provide forward momentum. For a given load condition, such as moving the vehicle from a standing start, increasing the engine torque generally causes an increase in the speed of the engine.

During warm-up periods of engine operation, when an engine is started from an initial temperature that is well below the predetermined normal operating temperature, it is desirable to provide specific engine control relating to engine temperature. In automobile and vehicular applications this most often takes the form of setting an increased idle speed, or "cold" idle operating scheme while the engine warms up. This control scheme still allows the operator to increase the engine speed and operate the vehicle, while preventing engine stalling when the engine returns to an idle state prior to reaching its full operating temperature. The cold idle control scheme may provide control over the fuel/air ratios, valve and ignition timing, or any other engine subsystem controlled by the electronic control unit and may be directed at emissions output and engine efficiency as well as stall prevention. The cold idle approach to engine control is generally adequate for motor vehicle operation. However, it presents several drawbacks if used in the control of an internal combustion engine used, for example, in an industrial application.

When an internal combustion engine is employed in an industrial application, the engine output is generally considered in terms of either engine speed or engine torque. The control of engine torque output is used in respect to the specific loading to be placed on the engine without regard for changes to engine speed. The idea being to control the specific amount of engine torque delivered to the associated transmission so that the transmission is loaded within its operating limits. As the load, or work, on the engine increases, the engine speed is allowed to decrease to maintain the application of a desired engine torque. As the load decreases, the engine speed is allowed to increase.

The control of engine speed is used in situations where the speed of the engine must remain a constant despite a changing load condition. One example of this type of application includes an alternating current electrical generator where the output frequency of the alternating current is dependent upon the engine speed. In this representative example, as the load on the generator increases, the torque produced by the engine must increase in order to maintain the constant engine speed, and thus a constant generator output frequency. The desired speed of the engine may be operator controllable through a speed request input to an electronic control unit, so that the control unit drives the engine as necessary to maintain its speed.

Many industrial engine applications require the engine to operate in one or more of these modes at different times, and sometimes simultaneously. For example, a self-propelled highway-compatible crane operates in the torque control mode when traveling on the highways. Once at a job site, the crane's engine is switched to operate in the speed control mode for proper operation of the crane assembly. When started from a cold state condition, it is undesirable to operate these industrial engines without a warm-up period to bring the engine to operating temperature. A warm-up period is required to prevent damage to the engine and to prevent stalling of the cold engine under load.

Internal engine damage can occur when the engine fluids, most importantly the lubricant oil, are cold and viscous on first starting the engine. As used herein, the term "cold" refers to the condition where the engine and its operating fluids are below a predetermined temperature such that the fluids are too viscous to function adequately for their intended purposes. For example, during periods of non-activity, the engine oil drains or bleeds off many of the internal bearing and interacting surfaces of the engine. Then, when the cold engine is started, these surfaces may lack, or have very little of, the necessary engine oil film to protect them from the metal-to-metal contact in the first minutes of operation. Additionally, with the components of the engine cold, the tolerances between the moving parts are at their greatest. Thus, if a working load is applied to a cold engine, the lack of lubrication and greater tolerances can cause greater wear among the engine components. A cold engine placed under load may also develop hot spots within the cooling jacket until the coolant warms and begins to flow. This condition may ultimately result in localized heat related weaknesses in the engine components. Additional operational considerations are an excessive white smoke output from a cold engine and a reduction in fuel efficiency.

Cold engine stalling can occur due to the fact that a cold engine is difficult to control with even the most sophisticated engine controls. For example, the incoming fuel may coagulate and prevent proper atomization, and the engine coolant may be relatively static. In these operating conditions, the combustion reaction is difficult to control and maintain. Nevertheless, operators sometimes request engine torque or speed prior to the conclusion of a proper engine warm-up period.

Merely applying the cold idle scheme of an automobile or other motor vehicle, as described above, fails to provide for a proper warm-up period as it merely increases the idle speed while still allowing an operator input to increase engine torque or speed output without regard for engine temperature. Additionally, known methods of governing industrial engines for torque and/or speed limiting do not address the need for a warm-up period. Therefore, it is most often left to the operator to subjectively allow for a proper engine warm-up period. As noted above, the drawback inherent with this approach is that an operator can indiscriminately request a torque or speed increase without waiting for the engine to reach the proper operating temperature, and in this case, the engine may respond with detrimental results. For example, the engine can stall such that a load may be dropped and/or the engine could sustain mechanical damage. Thus, there is an ongoing need in the art to provide for a mandatory engine warm-up period for internal combustion engines that are controlled as a function of their torque and/or speed outputs.

SUMMARY OF THE INVENTION AND ADVANTAGES

The present invention overcomes the disadvantages of the related art by providing an engine control system that imposes a mandatory warm-up period. The engine control system includes an electronic control module (ECM) having a torque inhibit circuit and a speed inhibit circuit, and an at least one engine fluid temperature sensor in electrical communication with the torque inhibit circuit and the speed inhibit circuit of the ECM. The sensor is exposed to at least one engine fluid. The sensor is adapted to provide an inhibit signal to the torque inhibit circuit and to the speed inhibit circuit of the ECM indicative of the temperature of at least one fluid within the engine. The torque inhibit circuit and the speed inhibit circuit are operable to cause the ECM to disregard any requests from an operator commanding an increase in engine torque or engine speed until such time as the inhibit signal from the temperature sensor exceeds a predetermined threshold.

The present invention also overcomes the disadvantages of the related art by providing a method of controlling an internal combustion engine so that it has a mandatory warm-up period. The method includes the steps of monitoring the temperature of at least one engine fluid and providing a signal indicative of that temperature to an ECM. The method will then inhibit any torque request signal from an operator until the engine fluid reaches a predetermined threshold and inhibit any speed request signal from an operator until the engine fluid reaches a predetermined threshold. The method then enables either torque requests or speed requests from an operator once the signal indicates that the engine fluid exceeds the predetermined threshold.

In this manner, the present invention provides a mandatory, controlled, and uninterrupted warm-up period for an internal combustion engine from a cold start condition to its predetermined operating temperature so that engine damage and excessive wear is prevented. These two undesirable effects are avoided by allowing the engine fluids, such as the lubricating oil, to reach a temperature range where they are most effective before loading the engine. Additionally, the components of the engine are allowed to reach a heated and stable condition so that the tolerances of the engine reach the proper state before allowing the operator to command increases in engine torque or speed outputs to load the engine. This also precludes the common white smoke output of a cold engine and maintains good fuel efficiency.

Another advantage of the present invention is that it removes the safety hazards concerned with operating a cold or improperly warmed engine under load. A cold engine generally operates inefficiently to the point of balking and stalling. If an operator is allowed to command increases of torque or speed output from a cold engine, a balk or stall could cause a load weight to be dropped or a tension on a cable to be lost, for example. Such a failure obviously poses a great physical threat to the operator or those working in the immediate vicinity. Accordingly, engine control system and method of controlling an internal combustion engine having a mandatory engine warm-up period of the present invention eliminates these concerns.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1A:
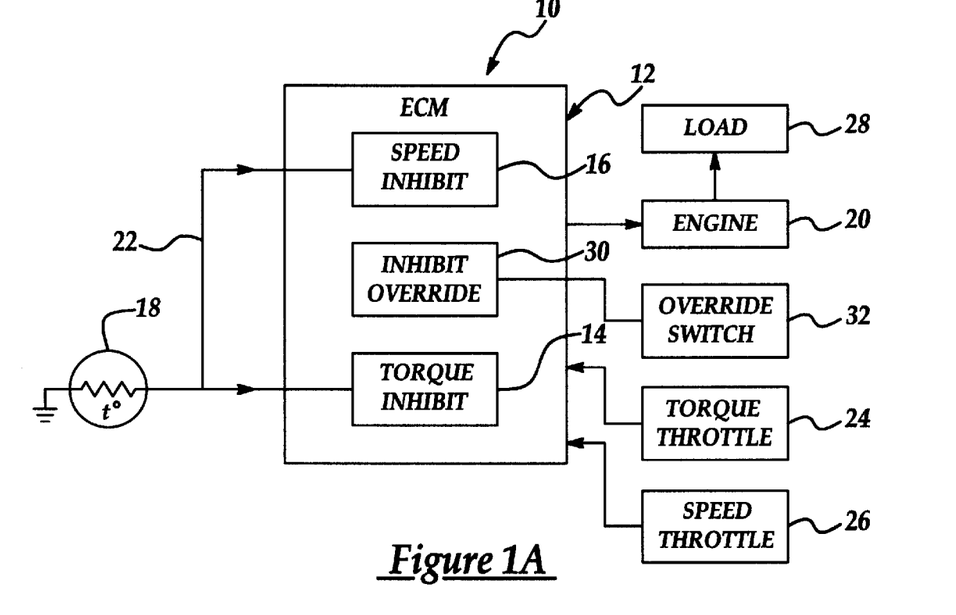
FIG. 1A is a functional block diagram of an engine control system for an internal combustion engine having a mandatory engine warm-up period of the present invention utilizing a thermistor.

FIG. 1A is a block diagram representing one embodiment of the present invention. In this embodiment, an engine control system that provides a mandatory warm-up period for an internal combustion engine of the present invention is generally indicated at 10. The engine control system 10 includes an electronic control module (ECM) 12 having a torque inhibit circuit 14 and a speed inhibit circuit 16. The engine control system 10 is adapted to control many of the functions of the internal combustion engine, schematically indicated at 20. It should be appreciated by those of ordinary skill in the art that any of the control functions provided by the engine control system 10 that are not related to inhibiting operator requests for torque or speed by providing a mandatory engine warm-up period are beyond the scope of the present invention.

The engine control system 10 further includes at least one engine fluid temperature sensor 18 in electrical communication with the torque inhibit circuit 14 and the speed inhibit circuit 16 of the ECM 12. The engine fluid temperature sensor 18 is mounted on the internal combustion engine 20 such that it is exposed to at least one engine fluid. The particular engine fluid may be one of any type of engine fluid including, but not limited to, engine coolant, engine oil, engine intake air, engine exhaust gas, turbo charge air, or intercooler temperature. The sensor 18 is adapted to provide an inhibit signal to the torque inhibit circuit 14 and to the speed inhibit circuit 16 of the ECM 12 that is indicative of the temperature of the at least one fluid within the engine 20. Thus, the temperature sensor 18 is electrically connected to both the torque inhibit circuit 14 and the speed inhibit circuit 16, ideally through an electrical bus generally indicated at 22. The inhibit signal provided by the sensor 18 is operable to cause the ECM 12 to disregard any requests from an operator commanding an increase in engine torque or engine speed until such time as the inhibit signal from the temperature sensor 18 exceeds a predetermined threshold. It should be appreciated by those of ordinary skill in the art that the temperature sensor 18 may be any one of a type of sensor that provides a varying signal in response to the temperature changes it is exposed to, and may be either an active or passive device. However, in a non-limiting manner, and for simplicity, the sensor 18 illustrated in the figures is a thermistor that provides a variable resistance to the ECM 12 based on temperature.

Under normal operations, control of the engine 20 involves controlling the amount of fuel provided to the engine 20. This in turn controls the amount of torque produced by the engine 20 and ultimately delivered to a load 26 that is mechanically connected to the engine 20. The amount of torque requested of the engine 20 is typically established by a torque throttle 24. The torque throttle 24 is generally an electronic transducer that converts a physical displacement into an electronic signal called a torque request signal. Normally, the torque throttle 24 is a foot pedal type device (not shown) operated by a user. However, since the structure of the torque throttle is beyond the scope of this invention, any other type of torque throttle, such as a hand throttle, may be used as long as it is in keeping with providing a usable electrical signal to the ECM 12. For example, the torque throttle 24 may be comprised of a potentiometer type device that applies a bias voltage to the ECM 12. In alternative embodiments, the torque throttle 24 may be electrically connected to an electronics unit (not shown) other than the ECM 12. The ECM 12 would then receive the torque request signal via discrete wiring, digital bus, or other communications link established with the other electronics unit.

The engine 20 may also be operatively controlled by the ECM 12 through operator inputs delivered through a speed throttle 26 connected to the ECM 12. The speed throttle 26 may be a foot pedal type device similar to the torque throttle 24 described above. Since the structure of the speed throttle is also beyond the scope of this invention, any other type of speed throttle may be used. For example, a hand type throttle, or a voltage divider for fixed engine speed applications, or a frequency input signal proportional to the requested engine speed, or a potentiometer type device that applies a bias voltage may all be used, as long as it is in keeping with providing a usable electrical signal to the ECM 12. Also, in alternative embodiments, the speed throttle 26 may be electrically connected to an electronics unit (not shown) other than the ECM 12. The ECM 12 would then receive the speed request signal via discrete wiring, digital bus, or other communications link from the other electronics unit.

Therefore, in operation, the ECM 12 of the engine control system 10 controls the speed and torque output of the engine 20 in response to torque and speed requests from operator inputs generated through the torque and speed throttles 24 and 26. However, as previously described, the inhibit signal from the temperature sensor 18 to the inhibit circuits 14, 16 prevents the ECM 12 from responding to operator requests for increases in torque or speed until such time as the engine reaches a predetermined temperature. In the preferred embodiment, the ECM 12 is software programmable or includes the circuitry such that the inhibit signal from the temperature sensor 18 is compared to a stored predetermined temperature threshold and causes the ECM 12 to disregard operator requests to increase engine torque or speed when the inhibit signal is below the predetermined threshold and to honor the requests when the inhibit signal exceeds the threshold. In this manner, a mandatory, and uninterrupted, engine warm-up period is provided.

Figure 1B:
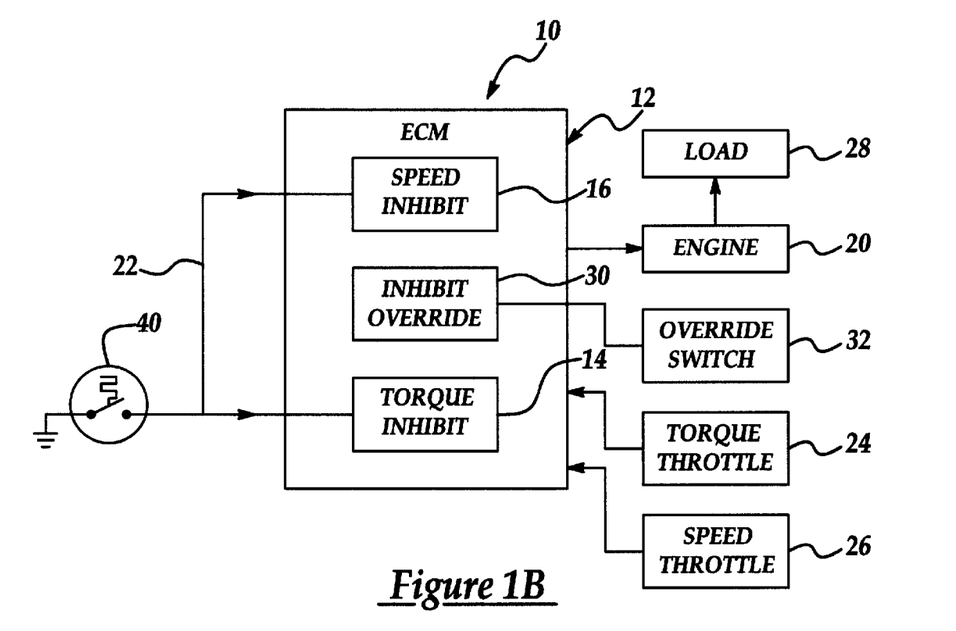
FIG. 1B is a functional block diagram of an engine control system for an internal combustion engine having a mandatory engine warm-up period of the present invention utilizing a temperature responsive switch.

In another non-limiting embodiment, the sensor may take the form of a switch 40 as shown in FIG. 1B. The switch 40 may include any variety of a type that thermally responds and either opens or closes a set of contacts (not shown) in response to being exposed to a varying temperature. For example, the switch 40 may be a bi-metal contact switch that is either normally open or normally closed, having its physical body in electrical communication with one of the contacts. As in the embodiment described above, the switch 40 is mounted on the internal combustion engine 20 such that it is exposed to at least one engine fluid. Mounting the switch 40 to the engine brings its body to ground potential electrically with the engine block. Since the body of the switch 40 is in electrical communication with one of its contacts, the switch 40 provides a ground signal to the torque inhibit circuit 14 and to the speed inhibit circuit 16 of the ECM 12 when its contacts are closed. If, as in one non-limiting embodiment of the present invention, a switch 40 is used that is normally closed, then a ground signal is provided to the torque inhibit circuit 14 and to the speed inhibit circuit 16 of the ECM 12 until such time as the engine fluid being monitored reaches a predetermined threshold. The predetermined threshold is the temperature at which the internal contacts of switch 40 open.

If, as in another non-limiting embodiment, a switch 40 is used that is normally open, then a ground signal is provided to the torque inhibit circuit 14 and to the speed inhibit circuit 16 of the ECM 12 when the monitored fluid reaches a predetermined threshold. The predetermined threshold is the temperature at which the contacts of switch 40 close. In either case, the inhibit circuits 14 and 16 of the ECM 12 are responsive to either the application or removal of the ground signal and, in this way, allow the ECM 12 to control the response to operator requests for engine torque or speed, by either ignoring them prior to warm-up or acting on them after the engine temperature reaches the predetermined threshold. Therefore, the present invention overcomes the disadvantages and drawbacks of not having any type of engine warm-up applied to an industrial engine, which exposes the engine to possible damage or exposes the engine operator and bystanders to safety risks from a possible engine stall or fail. Also, the shortcomings of using conventional automotive engine warm-up schemes that only provide high idle conditions and allow the operator indiscriminately run the engine without proper warm-up are overcome.

On the other hand, those having ordinary skill in the art will appreciate that emergency situations or other dire circumstances could arise that would require the operator to forego the mandatory warm-up of the present invention and request torque or speed increases prior to the engine reaching a predetermined warm-up temperature. For these special circumstances, an override is provided. In the engine control system 10 of the present invention, the ECM 12 further includes an inhibit override circuit 30 that is in electrical communication with an inhibit override switch 32. The inhibit override switch 32 is selectively operable to provide an inhibit override signal to the ECM 12 so that the inhibit signal will be disregarded and the ECM 12 will honor the operator requests for increases in torque or speed even before the engine temperature threshold is met. The inhibit override circuit 30 provides the capability to the operator to override the mandatory warm-up period by causing the ECM 12 to ignore the inhibit signal sent to the torque and speed inhibit circuits 14, 16 and allowing immediate response to operator requests. The override switch 32 is, in some manner, physically available to the operator and provides a manually actuated selection of the inhibit override.

Figure 2A:
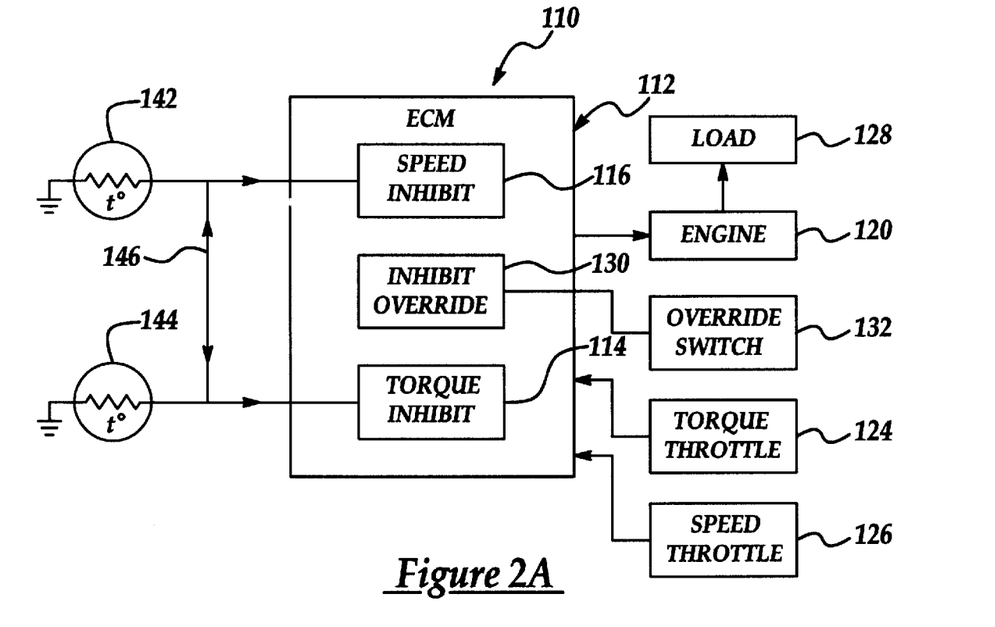
FIG. 2A is a functional block diagram of an engine control system for an internal combustion engine having a mandatory engine warm-up period of the present invention utilizing more than one thermistor in parallel.
Figure 2B:
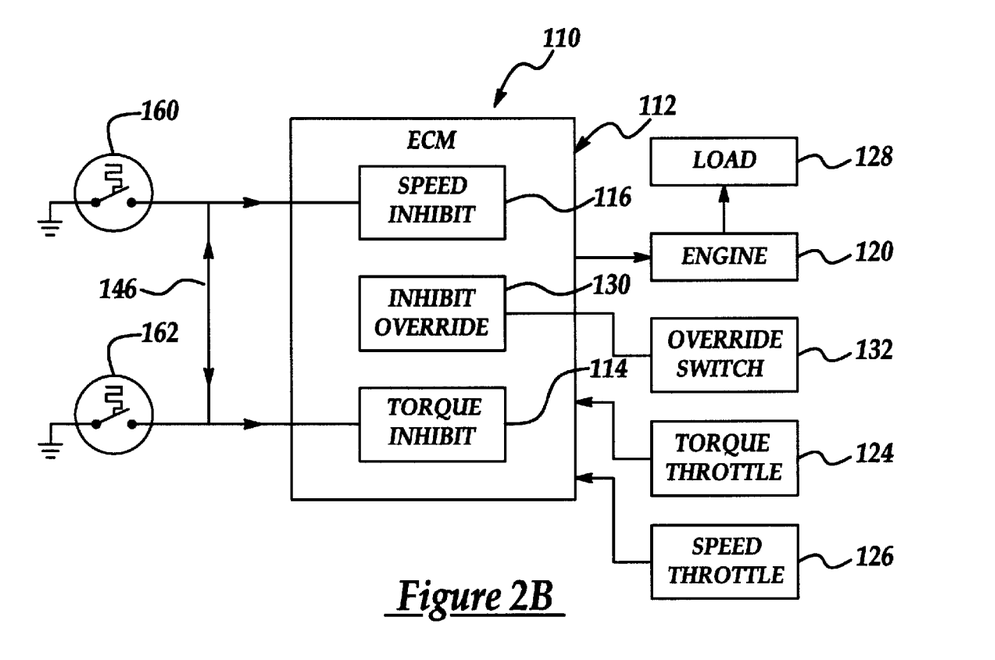
FIG. 2B is a functional block diagram of an engine control system for an internal combustion engine having a mandatory engine warm-up period of the present invention utilizing more than one temperature responsive switch in parallel.

Referring now to FIGS. 2A and 2B, where like numerals, increased by 100 with respect to the embodiments illustrated in FIGS. 1A and 1B, are used to designate like structure, an additional, non-limiting embodiment of an engine control system of the present invention is shown at 110. Referring to FIG. 2A, the engine control system 110 includes an ECM 112 having a first temperature sensor 142 and a second temperature sensor 144. Each temperature sensor 142, 144 is exposed to at least one engine fluid. The sensors 142, 144 are adapted to provide an inhibit signal to the torque inhibit circuit and to the speed inhibit circuit of the ECM 112 that is indicative of the temperature of the designated fluid within the engine 120. The inhibit signals from the temperature sensors 142, 144 are routed to the ECM 112 along a bus line 146. The inhibit signals cause the ECM 112 to disregard inputs from an operator commanding an increase in engine torque or engine speed until such time as both of the inhibit signals from the temperature sensors 142, 144 exceed a predetermine threshold. As in the previous discussion relating to FIG. 1A, it should be appreciated that the temperature sensors 142 and 144 may be any of type of temperature responsive sensors, but are illustrated for simplicity, in a non-limiting manner, as thermistors.

In the embodiment illustrated in FIG. 2B, the first and second temperature sensors are switches 160 and 162 that are exposed to at least one engine fluid. As in the discussion above relating to switch 40 of FIG. 1B, switches 160 and 162 are of a type that have internal contacts that respond to thermal changes, such as a bimetallic switch. Switches 160 and 162 are, in one embodiment, normally closed and are adapted to provide a ground signal to both the torque inhibit circuit 1 14 and to the speed inhibit circuit 116 of said ECM 112 until such time as the fluid being monitored reaches a predetermined threshold. The switches 160 and 162 are in electrical communication with the torque and speed inhibit circuits 114 and 116 of the ECM 112 and are also in parallel with each other, along bus line 164, so that both must reach the predetermined threshold before the ground signal is removed. In another non-limiting embodiment, the switches 160 and 162 are normally open and are adapted to provide a ground signal to both the torque inhibit circuit 114 and to the speed inhibit circuit 116 of the ECM 112 when the monitored fluid reaches a predetermined threshold.

It should be appreciated that in some applications it may be desirable to have the two sensors monitor different engine fluids, and in other applications it may be equally desirable to have the two sensors monitor the same engine fluid. For example, monitoring the temperature of a single engine fluid can provide inflow and outflow temperatures of an engine fluid, such as coolant. On the other hand, monitoring more than one engine fluid can provide more of an overall engine temperature profile by monitoring the various fluid temperatures throughout the engine. Therefore, sensors 142, 144 and 160, 162 may be equally employed in a single engine fluid or in more than one engine fluid depending on the application.

Figure 3A:
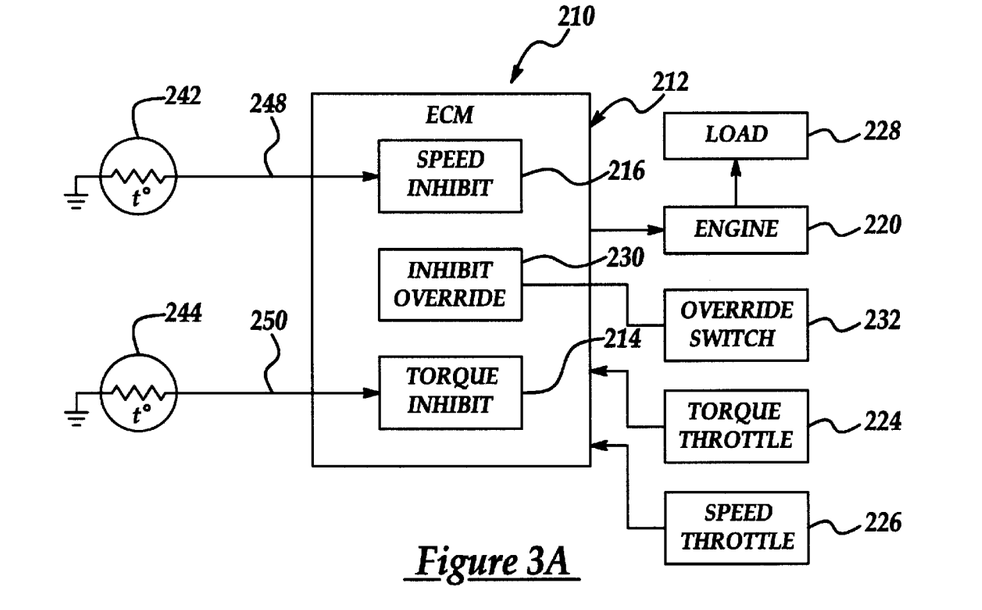
FIG. 3A is a functional block diagram of an engine control system for an internal combustion engine having a mandatory engine warm-up period of the present invention utilizing more than one thermistor.
Figure 3B:
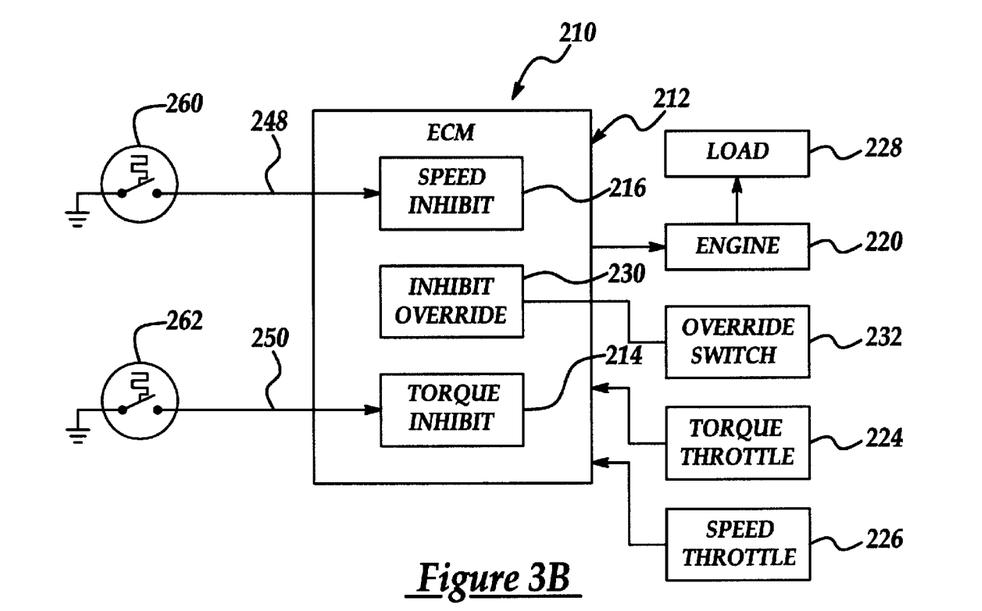
FIG. 3B is a functional block diagram of an engine control system for an internal combustion engine having a mandatory engine warm-up period of the present invention utilizing more than one temperature responsive switch.

Referring now to FIGS. 3A and 3B, where like numerals, increased by 100 with respect to the embodiments illustrated in FIGS. 2A and 2B, are used to designate like structure, an additional, non-limiting embodiment of an engine control system of the present invention is shown at 210. Referring to FIG. 3A, the engine control system 210 has an ECM 212 having a first temperature sensor 242 and said second temperature sensor 244 which are in electrical communication with the torque inhibit circuit 214 and the speed inhibit circuit 216, respectively. Each temperature sensor 242, 244 is exposed to at least one engine fluid. The temperature sensors 242 and 244 are adapted to individually provide an inhibit signal to their respective inhibit circuits 214 and 216. In this way, one sensor provides an inhibit signal to the torque inhibit circuit 214 and one sensor provides an inhibit signal to the speed inhibit circuit 216. The inhibit signals are indicative of the temperature of the engine fluid that is being monitored.

The inhibit signals from the temperature sensors 242 and 244 are routed individually to the ECM 212 along bus lines 248 and 250, respectively. The inhibit signals cause the ECM 212 to disregard inputs from an operator commanding an increase in engine torque or engine speed until such time as both of the inhibit signals from the temperature sensors 242, 244 exceed a predetermine threshold. As in the previous discussion relating to FIG. 2A, it should be appreciated that the temperature sensors 242 and 244 may be any of type of temperature responsive sensors, but are illustrated for simplicity, in a non-limiting manner, as thermistors.

In another non-limiting embodiment, FIG. 3B depicts an engine control system 210 that includes an ECM 212 having a first temperature sensor 260 and the second temperature sensor 262 that are switches and in electrical communication with the torque inhibit circuit 214 and the speed inhibit circuit 216 respectively. In this embodiment, switch 260 provides an inhibit signal to the torque inhibit circuit 214 and switch 262 provides an inhibit signal to the torque inhibit circuit 216. The switches 260 and 262 are exposed to at least one engine fluid and are adapted to individually provide a ground signal to the torque and speed inhibit circuits 214 and 216 of the ECM 212 along bus lines 248 and 250 respectively. As in the discussion above relating to switch 40 of FIG. 1B, and switches 160 and 162 of FIG. 2B, the switches 260 and 262 are of a type having internal contacts that respond to thermal changes, such as a bi-metallic switch.

Switches 260 and 262 are, in one embodiment, normally closed and are adapted to provide a ground signal individually to the torque inhibit circuit 214 and to the speed inhibit circuit 216 respectively until such time as the fluid reaches a predetermined threshold. In another non-limiting embodiment, the switches 260 and 262 are normally open and are adapted to individually provide a ground signal to the torque inhibit circuit 214 and to the speed inhibit circuit 216, respectively when the fluid reaches a predetermined threshold. As noted above, it should be appreciated that in some applications it may be desirable to have the two sensors monitor different engine fluids, and in other applications it may be equally desirable to have the two sensors monitor the same engine fluid.

Figure 4:
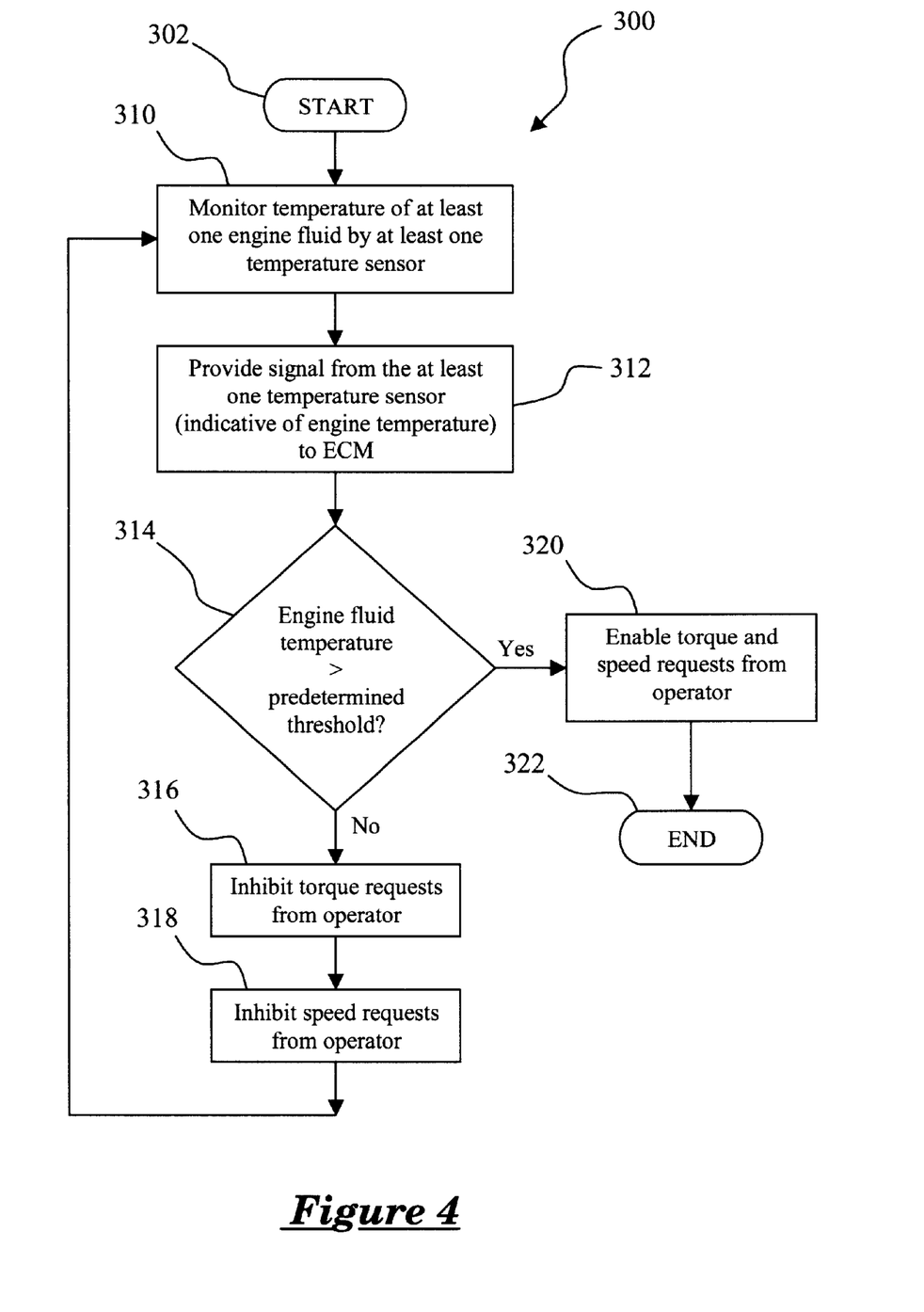
FIG. 4 is a flow diagram representing the method for providing control of an engine control system for an internal combustion engine having a mandatory engine warm-up period according to the present invention.

Referring now to FIG. 4, the method of controlling an internal combustion engine having a mandatory engine warm-up period of the present invention will be described in greater detail. The method is described in connection with the flow diagram, generally indicated at 300 in FIG. 4 which, in essence, outlines a sub-routine of the engine control system 10. Those having ordinary skill in the art will appreciate that flow diagram 300 may be only one of a number of other programs or sub-routines that control the operation of the internal combustion engine 20. The method of the present invention as illustrated in flow diagram 300 controls the desired mandatory warm-up period for the engine 20, thereby protecting it from damage from a premature loading condition prior to it reaching a desired operating temperature. By properly warming the engine 20, the method of the present invention also protects the operator and the surroundings from possible damage by avoiding the likelihood of a cold engine stall under loaded conditions.

The method begins at start point 302, which includes a typical start of a cold internal combustion engine. It should be appreciated that the engine control system 10 will initiate the method of the present invention whenever the engine 20 is started, even if immediately after running for an extended period. The method immediately enters the process step 310 of monitoring the temperature of at least one engine fluid and providing a signal indicative of that temperature to the ECM 12 in step 312. The method then enters a decision block 314 in which the ECM 12 determines if the temperature signal has reached the predetermined threshold. For example, the decision block query may be stated as "Has the temperature signal reached the predetermined threshold?" or "$S_t > T_t$", where $S_t$ is the temperature signal and $T_t$ is the predetermined threshold that corresponds to the desired engine operating temperature. If the signal has not reached that predetermined threshold, then the method follows the NO branch and performs process step 316. In process step 316, the torque inhibit circuit 14 causes the ECM 12 to disregard and thereby inhibit torque request signals from the operator so that the ECM 12 does not command the engine to increase its torque output.

Process step 318 immediately follows in which the speed inhibit circuit 16 causes the ECM 12 to disregard and thereby inhibit speed request signals from the operator so that the ECM 12 does not command the engine to increase its speed output. The method then continues and loops back to step 310 for a continued monitoring of the temperature of the engine fluid and to again provide the signal indicative of that temperature to the ECM 12 in step 312. If upon entering the decision block 314, it is determined that the temperature signal has now met or exceeds the predetermined threshold, then the method follows the YES branch and performs process step 320. Process step 320 enables the torque and speed inhibit circuits 14 and 16 which causes the ECM12 to honor a torque request or a speed request from the operator once said signal indicates that the engine fluid exceeds the predetermined threshold.

In another non-limiting embodiment, a further step is included at 310 in which a sensor for the engine oil and a sensor for the engine coolant are provided and are substituted for the one sensor to allow for monitoring of both the engine oil temperature and the engine coolant temperature. The two sensors provide signals indicative of the engine fluid temperatures to the ECM 12 in step 312.

In another non-limiting embodiment, a further step is included at 310 in which a sensor for the engine oil and a sensor for the engine coolant are provided and are substituted for the one sensor. The engine oil and engine coolant sensors are switches. The switches allow for monitoring of the engine oil temperature and the engine coolant temperature and both provide a ground signal to the ECM 12 in step 312. Then, as an alternate decision block to that of 314, the ECM 12 will determine if the ground signal is present. If it is, a YES branch is followed and a process step is performed in which the torque inhibit circuit 14 causes the ECM 12 to inhibit torque request signals from the operator so that the ECM 12 does not command the engine to increase its torque output. Immediately following, a second process step is performed in which the speed inhibit circuit 16 causes the ECM 12 to inhibit speed request signals from the operator so that the ECM 12 does not command the engine to increase its speed output. The method then continues and loops back to step 310 for a continued monitoring of the ground signals from the switches. The method reenters the decision block to again determine if the ground signal is present. In this case, when the predetermined engine operating temperature has been reached the switches remove the ground and the NO branch is followed. This routes the method to process step 320, in which the torque and speed inhibit circuits 14 and 16 cause the ECM 12 to allow either a torque request or a speed request from the operator.

An additional non-limiting embodiment of the method may also include the step of providing a sensor for the engine oil and a sensor for the engine coolant. In this case, the engine oil and engine coolant sensors are switches. The switches provide a ground signal to the ECM 12 when the monitored temperatures reach a predetermined threshold. Thus, when the decision block looks for a ground signal, but the engine is cold and the predetermined temperature threshold has not been met, the NO branch is taken and the torque and speed requests are inhibited. Once the temperature threshold has been met, the switches provide a ground signal and the YES branch of the decision block routes the method to the aforementioned 320 process block, thereby enabling any subsequent speed request or a torque request from the operator.

In another non-limiting embodiment of the method of the present invention, the method further includes the steps of providing an inhibit override switch of the type indicated at 32 in FIG. 1A in electrical communication with the ECM 12. In this method, a second decision block is added down line of the NO (continue to inhibit torque and speed requests) branch of the decision block 314. This second decision block receives an input from the inhibit override switch 32. The decision block asks if the inhibit override switch been activated. If it has not, then a NO branch routes the method to the 316 and 318 inhibit process blocks as described above. If the inhibit override switch has been activated, then a YES branch routes the process to the 320 enabling process block to allow enabling of either a speed request or a torque request from the operator even if the temperature signal or signals have not reached the predetermined threshold yet. This embodiment provides the ability for the operator to override the mandatory warm-up period in case of an emergency in which the engine must be called upon to provide torque and/or speed increases before it reaches the predetermined operational temperature.

Accordingly, the method of the present invention provides for a mandatory engine warm-up period in an engine control system as applied to an internal combustion engine. In engines that are commanded based on torque and speed control, the present invention provides great advantages over conventional engine control systems that either provide no specific engine warm-up or those that merely apply simplistic automotive type high idle approaches. The present invention thereby provides a safety benefit by eliminating the cold operating conditions that lead to cold engine stalls, and it offers protection for the engine by eliminating the possibility of loading and operating an engine that is not properly brought to its design operating temperature.

While embodiments of the invention have been described in an illustrative manner, it is not intended that these embodiments illustrate and describe all possible forms of the invention. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. A method of controlling an internal combustion engine so that it has a mandatory warm-up period, said method comprising the steps of:

monitoring the temperature of at least one engine fluid and providing a signal indicative of that temperature to an electronic control module;

inhibiting a torque request signal from an operator until the engine fluid reaches a predetermined threshold;

inhibiting a speed request signal from an operator until the engine fluid reaches a predetermined threshold;

enabling either a torque request or a speed request from an operator once said signal indicates that the engine fluid exceeds the predetermined threshold.

2. A method of controlling an internal combustion engine as set forth in claim 1 further including the step of providing a sensor for the engine oil and a sensor for the engine coolant and monitoring both the engine oil temperature and the engine coolant temperature.

3. A method of controlling an internal combustion engine as set forth in claim 2 further including the steps of providing a sensor for the engine oil and a sensor for the engine coolant that are switches;

monitoring both the engine oil temperature and the engine coolant temperature and providing a ground signal to the electronic control module until the monitored temperatures reach a predetermined threshold;

inhibiting a torque request signal from an operator until said ground signal is removed;

inhibiting a speed request signal from an operator until said ground signal is removed; and enabling either a torque request or a speed request from an operator once said ground signal is removed.

4. A method of controlling an internal combustion engine as set forth in claim 2 further including the steps of providing a sensor for the engine oil and a sensor for the engine coolant that are switches;

monitoring both the engine oil temperature and the engine coolant temperature and providing a ground signal to the electronic control module when the monitored temperatures reach a predetermined threshold;

inhibiting a torque request signal from an operator until said ground signal is provided;

inhibiting a speed request signal from an operator until said ground signal is provided; and enabling either a torque request or a speed request from an operator once said ground signal is provided.

5. A method of controlling an internal combustion engine as set forth in claim 2 further including the steps of providing a inhibit override switch in electrical communication with the electronic control module;

monitoring the inhibit override switch and providing a signal to the engine electronic control module if the inhibit override switch is selected by an operator;

enabling either a torque request or a speed request from the operator once said inhibit override signal is provided even if said temperature signals have not reached the predetermined threshold yet.

* * * * *